United States Patent Office 2,907,628
Patented Oct. 6, 1959

2,907,628

NEPTUNIUM SOLVENT EXTRACTION PROCESS

Lyle R. Dawson, Lexington, Ky., and Paul R. Fields, Chicago, Ill., assignors to the United States of America as represented by the United States Atomic Energy Commission No Drawing. Application June 22, 1949
Serial No. 100,744

3 Claims. (Cl. 23—14.5)

This invention relates to the separation of neptunium from an aqueous solution by solvent extraction, to the extraction of neptunium from an organic solvent solution, and to the purification of neptunium.

It has recently become known that various isotopes of neptunium, the transuranic chemical element having an atomic number of 93 and the symbol Np, can be prepared by a number of different nuclear processes. For example, it is known that neptunium can be produced in small quantities using a cyclotron for the bombardment of natural uranium with neutrons as follows:

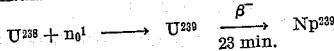

This isotope of neptunium has a half-life of 2.33 days and by beta decay is converted to the plutonium isotope $Pu^{239}$.

In addition to the production of neptunium and plutonium by neutron bombardment of uranium using a cyclotron, neutronic reactors have been developed for the production of neptunium, plutonium, and desirable fission products from natural uranium by a self-sustaining chain reaction. One of the isotopes of uranium occurring in natural uranium is $U^{235}$ and it is present in the amount of 0.71% by weight. When this isotope is bombarded by slow neutrons, preferably of thermal energies, it undergoes fission and releases on an average about two neutrons per fission, in addition to the production of fission fragments of relatively low atomic weights. The main constituent of natural uranium, namely, $U^{238}$, absorbs thermal neutrons to produce $Np^{239}$ and $Pu^{239}$ as described above. Thus, in a natural uranium neutronic reactor the excess neutrons that are released by fission are sufficient to maintain a production of neptunium and plutonium through neutron absorption by the predominant uranium isotope $P^{238}$. However, the concentration of plutonium thus produced is generally small, rarely being above 1% by weight of the uranium and usually being substantially below this concentration. Thus, it is necessary to recover neptunium, plutonium, and fission products from uranium masses from neutronic reactors having neptunium, plutonium, and fission product concentrations below one part per thousand parts and even one part per million parts of uranium.

As mentioned above, during neutron-irradiation of uranium there is produced in addition to the transuranic elements, Np and Pu, other elements of lower atomic weight, known as fission fragments. These radioactive fission fragments are composed of two distinct groups of elements, namely, a light element group and a heavy element group. The light element group contains elements having atomic numbers between about 35 and 46 and the heavier element group having atomic numbers between about 51 and 60. The elements of both of these groups as originally produced, being considerably overmassed and undercharged, are highly unstable. By means of beta radiation they quickly transform themselves into isotopes of other elements having longer half-lives. The fission fragments and the resulting decay products are collectively known as fission products.

The various radioactive fission products have half-lives that range from a fraction of a second to thousands of years. Those having very short half-lives may be substantially eliminated by aging the neutron-irradiated material for a reasonable period of time before further processing. Those radioactive fission products having very long half-lives do not have a sufficiently intense radiation to endanger personnel protected by moderate shielding. On the other hand, the radioactive fission products that have half-lives ranging from a few days to a few years have dangerously intense radiations which cannot be eliminated by aging for practical storage periods. The fission products of the last described class are chiefly the radioactive isotopes of Sr, Y, Zr, Cb, and Ru of the light group and Te, I, Cs, Ba, La, Ce, and Pr of the heavy group.

During the operation of the neutronic reactor, i.e., a chain-reacting uranium-graphite pile, another isotope of neptunium, namely $Np^{237}$, is produced. It is an alpha-emitter with a half-life of about $2.2 \times 10^6$ years. By aging of the irradiated uranium, the concentration of $Np^{239}$, since it has a half-life of 2.33 days, becomes very small.

Various processes have been developed for separating neptunium from uranium and from plutonium whereby aqueous solutions of neptunium salts are obtained, especially such solutions also containing fission products.

An object of this invention is to provide a process for the separation of neptunium from an aqueous solution containing a neptunium salt.

A second object of the present invention is to separate neptunium from its mixture with fission products.

Another object of this invention is to provide a method for separating neptunium from its solution in the organic solvent used to extract neptunium from aqueous solutions.

Other objects of this invention will be apparent from the description which follows.

We have found that neptunium values can be separated from aqueous solutions of a neptunium nitrate containing nitric acid and a salting-out agent by extracting the neptunium nitrate using a liquid organic solvent that has an atom capable of donating an electron pair to a coordination bond.

There are several types of organic compounds that are satisfactory solvents for the extraction of a neptunium nitrate from an aqueous solution containing a salting-out agent. These types are ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. The extractive solvent is a liquid substantially immiscible with water and aqueous solutions. If it is a solid at room temperature, the extraction is carried out at a temperature above its melting point. The following is a list of compounds that are suitable extractants for the separation of a neptunium nitrate from aqueous nitric acid solutions containing a salting-out agent:

Diethyl ether
Diisopropyl ether
Butoxyethoxyethane (ethyl butyl "Cellosolve")
Diethyl ether of ethylene glycol (diethyl "Cellosolve")
Dibutyl ether of diethylene glycol (dibutyl "Carbitol")
Dibutyl ether of tetraethylene glycol
Ethyl acetate
n-Propyl acetate
Butoxyethoxyethyl acetate (butyl "Carbitol" acetate)
Methyl isobutyl ketone (hexone)
Acetophenone
Mesityl oxide
Cyclohexanone
Tert-amyl alcohol
2-ethyl-1-hexanol
Tributyl phosphate Trioctyl phosphate
Dioctyl hydrogen phosphate
Octadecyl dihydrogen phosphate
Nitromethane
Ethyl sulfide
n-Propyl sulfide Alkyl phosphates have the general formula:

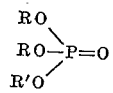

where R is a member of the group consisting of a hydrogen atom and an alkyl radical and R' is an alkyl radical. The total number of carbon atoms in the alkyl phosphate is preferably at least 12 to provide adequate water-immiscibility.

In addition to using the individual solvents the present invention contemplates the use of solvents that are mixtures of the various types. Some of these types of organic solvents are more effective than other types. Diethyl ether and methyl isobutyl ketone are preferred solvents for this process. In the foregoing list of classes of suitable organic solvents the compounds contain an oxygen atom or a sulfur atom capable of donating a pair of electrons to a coordination bond.

The neptunium nitrates suitable for extraction by the foregoing solvents are the nitrates of neptunium in the tetravalent and the hexavalent states. These compounds are $Np(NO_3)_4$ and $NpO_2(NO_3)_2$, respectively, and the latter nitrate is preferred.

The aqueous solution used for the extraction process contains nitric acid and the concentration can be varied widely. It is preferred that the concentration of nitric acid before the extraction is 1 to 5 N. This nitric acid concentration may be obtained as a result of previous processing wherein uranium, plutonium, etc. are separated from neptunium.

The salting-out agent to be added to the aqueous solution prior to the solvent extraction is a salt of nitric acid, which salt is itself unextractable by the organic solvent of this invention. The following compounds are examples of suitable salts: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, and $Al(NO_3)_3$. The molar concentration of the salting-out agent will depend upon the valence of the cation and the concentration of the anion desired. In general, the salting-out agent concentration will be between 3 and 12 M.

In one embodiment of this invention neptunium is separated from an aqueous solution containing a neptunium nitrate, said neptunium being tetravalent or hexavalent, nitric acid, and a nitrate salting-out agent by contacting the solution with an organic solvent of the type described above. It is preferable that the contact time be sufficient for an equilibrium of the neptunium salt between the aqueous phase and the organic solvent extract phase. A contact time of at least two minutes is preferred. The phases are separated and the organic solvent extract phase contains a neptunium salt. In this embodiment, the aqueous solution may also contain nitrates of fission products which remain in the aqueous phase.

In a second embodiment of the present invention, the process of the first embodiment is carried out and the neptunium nitrate is separated from the organic solvent extract phase by contacting it with water and separating an organic solvent phase and an aqueous extract phase. Certain of the organic solvents of this invention extract a considerable amount of nitric acid from the original aqueous solution and this nitric acid content is extracted by the water, thereby reducing the degree of extraction of neptunium into the aqueous extract phase. For this reason, it is preferred to contact the organic solvent extract phase containing the neptunium nitrate with water for removal of nitric acid and part of the neptunium salt and after separating the two phases to contact the organic solvent extract phase with an additional amount of water and to separate the organic solvent phase and aqueous extract phase. The two aqueous extract phases are combined for maximum yield of neptunium salt.

Another embodiment consists only of the extraction of a neptunium nitrate from its solution in an organic solvent of the type disclosed above by contacting with water and separating an organic solvent phase and an aqueous extract phase.

The volume ratio of aqueous solution to organic solvent may be varied widely, e.g., between 10:1 and 1:10. The ratio of organic solvent to water in the re-extraction also may be varied widely.

The following examples, taken alone and in combination, are illustrative of the various embodiments of this invention. While the examples used $Np^{239}$, they are illustrative, of course, of the invention for the other isotopes of neptunium.

EXAMPLE I

The following solutions were mixed: 1 ml. of 10 N nitric acid containing 50 mg. of trivalent bismuth as bismuth nitrate; 0.625 ml. of 2 N nitric acid solution containing a tracer concentration of a mixture of nitrates of penta- and hexavalent neptunium, namely, $NpO_2NO_3$ and $NpO_2(NO_3)_2$; 0.316 ml. of concentrated nitric acid; and 0.06 ml. of water. The final solution was 2 ml. of 8 N nitric acid containing 25 mg./ml. of trivalent bismuth, and approximately $9.4 \times 10^8$ beta counts/min. (about 25% geometry) due to $Np^{239}$. Ammonium hexanitratocerate was added to a 1-ml. sample of this solution in sufficient amount to impart a greenish-yellow color to the solution. This compound oxidized pentavalent neptunium to the hexavalent state. Ammonium nitrate in the amount of 1.6 g. was added to the solution to produce 2 ml. of final solution containing 10 M ammonium nitrate and 4 N nitric acid. A similar amount of ammonium nitrate was added to the other 1-ml. sample without the use of ammonium hexanitratocerate. The two solutions were respectively extracted with three times their volume of diethyl ether and hexone, i.e., methyl isobutyl ketone, as follows: The mixture of aqueous solution and organic solvent was shaken mechanically in a flask for ten minutes. After the two layers separated, the flask was immersed in a Dry Ice-acetone freezing bath. When the aqueous phase was frozen, the organic solvent layer was poured into another flask containing distilled water in a volume equal to about one-third of the volume of the organic solvent. The distilled water and organic solvent were shaken for ten minutes, the water phase was frozen and the organic solvent poured back into the first flask containing the original aqueous solution. The cycle was continued two more times with a small amount of ammonium hexanitratocerate being added to the aqueous solution in the first flask for the ether experiment before each extraction to insure maintenance of previously unextracted neptunium in the hexavalent state. The organic solvent phase, the aqueous raffinate phase, and the aqueous extract phase for each experiment were analyzed for beta counts to determine the percent $Np^{239}$ extraction and re-extraction. The data are presented below in Table I.

*Table I*

| Organic Solvent Used | Percent $Np^{239}$ Extracted by Organic Solvent | Percent $Np^{239}$ in Aqueous Extract [1] |
|---|---|---|
| Diethyl ether | 93.7 | 80.2 |
| Methyl isobutyl ketone | 86.2 | 77 |

[1] Based on $Np^{239}$ content of original aqueous solution.

EXAMPLE II

A 2-ml. quantity of 8 N nitric acid containing 25 mg./ml. of trivalent bismuth as bismuth nitrate, $Np^{239}$ tracer, and fission products in tracer quantities was prepared. The $Np^{239}$ concentration was about the same as in Example I. Ammonium hexanitratocerate was added to a 1-ml. quantity of the solution followed by ammonium nitrate addition and ether extraction as in Example I. Ammonium nitrate was added to the other 1-ml. sample as in Example I followed by methyl isobutyl ketone extraction. In each experiment after the third cycle, the organic solvent layer was shaken for ten minutes with 1.5 ml. of distilled water. The water layer was frozen and organic solvent was poured back into the first flask. One more extraction cycle was carried out using this 1.5-ml. quantity of water to wash the organic solvent for re-extraction of neptunium values. The aqueous raffinate phase, the organic solvent phase and the two aqueous extract phases were analyzed for beta-activity. The extraction and re-extraction data are presented in Table II.

Table II

| Organic Solvent Used | Percent $Np^{239}$ Extracted by Organic Solvent | Percent $Np^{239}$ in— | |
|---|---|---|---|
| | | 1st Aq. Extract [1] | 2nd Aq. Extract [1] |
| Diethyl ether | 97.4 | 86.2 | 10.1 |
| Methyl isobutyl ketone | 89.4 | 72.5 | 16.8 |

[1] Based on $Np^{239}$ content of original aqueous solution.

The data show the value of the aqueous re-extraction for maximum recovery of neptunium from the organic solvent phase. The data also show the fission products do not impair the extraction and re-extraction efficiencies.

EXAMPLE III

Two experiments were carried out in a similar manner to those described in Example II except no fission products were present and the nitric acid concentration was only 2 N after ammonium nitrate addition, i.e., the concentration was only one-half the concentration used in Example II. Ammonium hexanitratocerate was used for oxidizing pentavalent neptunium to the hexavalent state in the methyl isobutyl ketone experiment, as well as in the ether experiment. Each initial aqueous solution contained $2.35 \times 10^8$ counts/min. (about 25% geometry) of $Np^{239}$. The extraction data are presented below in Table III.

Table III

| Organic Solvent Used | Percent $Np^{239}$ Extracted by Organic Solvent | Percent $Np^{239}$ in— | |
|---|---|---|---|
| | | 1st Aq. Extract [1] | 2nd Aq. Extract [1] |
| Diethyl ether | 99.6 | 94.1 | 5.7 |
| Methyl isobutyl ketone | >99.9 | 97 | 2.9 |

[1] Based on $Np^{239}$ content of original aqueous solution.

EXAMPLE IV

A 2-ml. quantity of 4 N nitric acid containing only 12.5 mg./ml. of Bi(III) and a tracer concentration of a mixture of salts of penta- and hexavalent neptunium was prepared. A 1-ml. portion was oxidized by the addition of ammonium hexanitratocerate. Ammonium nitrate was added to both 1-ml. portions as in the previous examples and the resulting solutions were extracted with methyl isobutyl ketone with re-extraction to produce two aqueous extract phases as in Example III. No fission products were present. The extraction data are presented below in Table IV.

Table IV

| Ce(IV) Used | Percent $Np^{239}$ Extracted by Methyl Isobutyl Ketone | Percent $Np^{239}$ in— | |
|---|---|---|---|
| | | 1st Aq. Extract [1] | 2nd Aq. Extract [1] |
| No | 89.7 | 85 | 4.7 |
| Yes | 99.9 | 80 | 19.5 |

[1] Based on $Np^{239}$ content of original aqueous solution.

EXAMPLE V

A 1-ml. quantity of a tracer solution of a mixture of nitrates of pentavalent and hexavalent neptunium and containing 4 N nitric acid and 12.5 mg./ml. of Bi(III) was oxidized by the addition of ammonium hexanitratocerate. Ammonium nitrate was added to produce a 10 N ammonium nitrate solution which was extracted for ten minutes with three times its volume of hexone. The mixture was put in a freezing bath and the water layer frozen. The hexone layer was poured into a 10-ml. buret and 10 ml. of an aqueous solution containing 10 M ammonium nitrate was slowly passed through hexone. The original solution contained $5.46 \times 10^7$ beta counts/min. (about 25% geometry). Analyses of the aqueous raffinate layer, the hexone layer after washing with the ammonium nitrate solution, and the ammonium nitrate wash solution showed that 97.4% of the neptunium was extracted by the hexone and only 0.7% (based on total neptunium content) was removed from the hexone solution by the ammonium nitrate wash.

EXAMPLE VI

An aqueous solution containing tracer concentrations of salts of fission products was prepared. The concentrations of nitric acid, ammonium nitrate, and $Bi(NO_3)_3$ were the same as in Example IV. The aqueous solution contained no $Np^{239}$. No ammonium hexanitratocerate was used. The solution was extracted with hexone and the hexone was extracted with water as in Example IV. The initial aqueous solution contained $2.96 \times 10^9$ beta counts/min. and $5.14 \times 10^5$ gamma counts/min. Analyses of the various layers showed that hexone extracted less than 1% of the beta-emitting fission products and less than 0.1% of the gamma-emitting fission products.

EXAMPLE VII

An aqueous solution containing 1 M nitric acid and a tracer mixture of the nitrates of penta- and hexavalent $Np^{239}$ was prepared. The beta counts/min./ml. (about 25% geometry) due to $Np^{239}$ were 19,690. A 1-ml. aliquot was saturated with sulfur dioxide and then made 10 M in ammonium nitrate. The resultant solution was shaken vigorously for ten minutes with three times its volume of hexone. The aqueous and hexone layers were allowed to separate and the hexone layer was removed and evaporated under vacuum over 1 ml. of dilute nitric acid. The resultant dilute nitric acid solution was analyzed for neptunium to determine the degree of hexone extraction. Another 1-ml. portion of the original solution was made 0.2 M in hydroxylamine instead of saturating with sulfur dioxide. After making 10 M in ammonium nitrate, the solution was extracted with hexone as in the case of the sulfur dioxide-saturated solution. Hexone extracted 26.4% of the neptunium from the sulfur dioxide-saturated solution whereas hexone extracted only 2.2% of the neptunium from the aqueous solution treated with the hydroxylamine. Sulfur dioxide reduces both hexa- and pentavalent neptunium to tetravalent neptunium which is fairly extractable as indicated. The amount of neptunium extraction can be increased by increasing the acidity of the ammonium nitrate solution and by increasing the number of extraction cycles. Hydroxylamine merely reduces hexavalent neptunium to pentavalent neptunium and its nitrate is not as extractable as tetra- and hexavalent neptunium.

EXAMPLE VIII

One pound of uranyl nitrate hexahydrate was placed in a neutronic reactor to produce $Np^{239}$. The sample was then dissolved in 2 l. of water, 150 ml. of concentrated nitric acid was added, sulfur dioxide was bubbled through the solution to reduce the neptunium to the tetravalent state, and a lanthanum fluoride precipitate was formed in the solution by the addition of the lanthanum salt and hydrofluoric acid to produce 350 mg. of precipitate. After allowing the precipitate to settle overnight, the supernatant solution was removed. The precipitate was transferred to a centrifuge tube as a slurry and it was centrifuged for ten minutes. The aqueous layer was removed and the precipitate washed and recentrifuged. The resultant precipitate was dissolved in zirconyl nitrate solution. Hydrogen peroxide was added and the solution was allowed to stand for ten minutes. The solution was then diluted with water. Hydrofluoric acid was added to produce a lanthanum fluoride precipitate. The solution was centrifuged and the precipitate was washed. This lanthanum fluoride precipitate contained the neptunium values and was free of uranium. The precipitate was dissolved in a minimum volume of zirconyl nitrate solution containing 3 N nitric acid. Potassium permanganate was added and the solution warmed to oxidize neptunium to the hexavalent state. The final volume was about 15 ml. Ammonium nitrate was added in the amount of 1.6 g./ml. of solution thereby increasing the volume to about 30 ml. This solution was contacted with 50 ml. of ether. The ether had been pretreated by washing with a 1 N nitric acid solution of potassium permanganate followed by thorough washing with water. The ether extraction of the hexavalent neptunium nitrate solution consisted of stirring the two solutions vigorously for ten minutes followed by a three-minute separation period. The flask containing the two layers was immersed in a freezing mixture of acetone and Dry Ice. After the aqueous layer froze, the ether layer was decanted and poured into a second flask containing 25 ml. of distilled water. The contents of the second flask were stirred vigorously for ten minutes and the contents allowed to settle for five minutes. The aqueous extract layer was frozen and the ether poured back into the first flask to continue the extraction cycle. After a total of three extraction cycles, the aqueous extract phase was heated to remove any dissolved ether. The final aqueous extract solution contained practically all of the neptunium originally present in the neutron-irradiated uranyl nitrate hexahydrate. The $Np^{239}$ recovered had a beta-activity of $2.7 \times 10^9$ counts/minute (about 30% geometry).

Similar recoveries were made of $Np^{239}$ from neutron-irradiated uranyl nitrate hexahydrate using ammonium hexanitratocerate as the oxidizng agent instead of potassium permanganate and using methyl isobutyl ketone or ether. Aluminum nitrate and other compounds capable of complex fluoride ions are suitable substitutes for zirconyl nitrate to dissolve lanthanum fluoride. Potassium dichromate was another oxidizing agent used for converting pentavalent neptunium to hexavalent neptunium before solvent extraction.

The process of the present invention may be carried out using well-known extraction procedures and apparatus. Thus, the extraction steps may be effected by the use of batch, continuous batch, batch countercurrent or continuous countercurrent methods. In column operation the organic solvent may be either the dispersed phase or the continuous phase.

The foregoing illustrations and embodiments of this invention are not intended to limit its scope, which is to be limited entirely by the appended claims.

What is claimed is:

1. In the process of separating neptunium values from an aqueous solution comprising nitric acid, nitrates of fission products, and neptunium nitrate wherein a salting-out agent is added, an oxidizing agent is added to raise the neptunium to the hexavalent state, and then bringing the aqueous solution into contact with a substantially water-immiscible liquid organic solvent and then separating the resulting aqueous phase and the resulting organic solvent extract phase containing said neptunium nitrate, the improvement consisting of carrying out said contact at a nitric acid concentration of about 2 N.

2. A process of separating neptunium values from an aqueous solution comprising nitric acid, neptunium nitrate, and fission product nitrates comprising adding an aqueous solution of ammonium nitrate sufficient to adjust the nitric acid concentration to about 2 N, adding ammonium hexanitratocerate in an amount sufficient to oxidize the neptunium to the hexavalent state, and then bringing the aqueous solution into contact with methyl isobutyl ketone and then separating the resulting aqueous phase and the resulting methyl isobutyl ketone phase.

3. In a process of separating neptunium values from an aqueous solution comprising nitric acid, nitrates of fission products, and neptunium nitrate wherein a salting-out agent is added, an oxidizing agent is added to raise the neptunium to the hexavalent state, and then the aqueous solution is brought into contact with a substantially water-immiscible liquid organic solvent and then the resulting aqueous phase is separated from the resulting organic solvent extract phase containing said neptunium nitrate, the improvement consisting of subsequently bringing the resulting organic solvent phase into contact with water to make a second aqueous phase and a second organic solvent phase and then bringing said second aqueous phase into contact with a substantially immiscible organic solvent to remove the neptunium values from said second aqueous phase.

References Cited in the file of this patent
UNITED STATES PATENTS

| | | |
|---|---|---|
| 2,227,833 | Hixson et al. | Jan. 7, 1941 |
| 2,811,415 | Seaborg | Oct. 29, 1957 |
| 2,882,124 | Seaborg | Apr. 14, 1959 |

OTHER REFERENCES

Fischer et al.: Ein Neues Verfahren zur Trennung der Seltenen Erden, Naturwissenschaften, vol. 25, p. 348 (1937).

Seaborg: The Chemical and Radioactive Properties of the Heavy Elements, Chemical and Engineering News, vol. 23, No. 23, pp. 2190–2193 (1945).

Katzin et al.: Theoretical Consideration of the Ether Extraction of Uranyl Nitrate From Aqueous Solutions Containing Various Metal Nitrate Salting Agents, AECD-2758, November 20, 1947 (declassified 1949). Technical Information Division, Atomic Energy Commission, Oak Ridge, Tenn.

Katz et al.: "The Chemistry of the Actinide Elements," p. 419 (1957).